United States Patent [19]
Asghar et al.

[11] Patent Number: 5,790,817
[45] Date of Patent: Aug. 4, 1998

[54] CONFIGURABLE DIGITAL WIRELESS AND WIRED COMMUNICATIONS SYSTEM ARCHITECTURE FOR IMPLEMENTING BASEBAND FUNCTIONALITY

[75] Inventors: Saf M. Asghar, Austin; Michael E. Spak, Kyle, both of Tex.

[73] Assignee: Advanced Micro Devices, Inc., Sunnyvale, Calif.

[21] Appl. No.: 719,799

[22] Filed: Sep. 25, 1996

[51] Int. Cl.$^6$ ................................................. H01J 13/00
[52] U.S. Cl. ......................... 395/309; 395/285; 395/287; 395/293; 395/311; 380/49
[58] Field of Search ........................... 395/309, 285, 395/286, 287, 292, 297, 306, 311, 519, 520, 521, 800, 750.07, 750.03, 728, 729, 731; 380/49; 364/131, 134; 370/81; 379/284

[56] References Cited

U.S. PATENT DOCUMENTS

| | | | |
|---|---|---|---|
| 5,418,967 | 5/1995 | Simcoe et al. | 395/728 |
| 5,428,730 | 6/1995 | Baker et al. | 395/154 |
| 5,475,818 | 12/1995 | Molyneaux et al. | 395/200.05 |
| 5,621,800 | 4/1997 | Weng et al. | 380/49 |
| 5,657,375 | 8/1997 | Connolly et al. | 455/436 |
| 5,675,751 | 10/1997 | Baker et al. | 395/309 |

*Primary Examiner*—Ayaz R. Sheikh
*Assistant Examiner*—Raymond N. Phan
*Attorney, Agent, or Firm*—Conley, Rose & Tayon; Jeffrey C. Hood

[57] ABSTRACT

A configurable multiprocessor communications architecture which performs digital communications functions and which is configurable for different digital communications standards, such as various digital cellular standards. In the preferred embodiment, the multiprocessor architecture includes two or more digital signal processing cores, a microcontroller or micro-scheduler, a voice coder/decoder (codec), and a relatively low performance central processing unit (CPU). Each of the above devices are coupled to a system memory. The general purpose CPU preferably performs user interface functions and overall communications management functions. A CPU local memory and various peripheral devices are coupled through a CPU local bus to the CPU, and these devices are accessible to the CPU without the CPU having to access the main system bus. A dual port bus arbiter is preferably coupled between the CPU and the system bus and controls access to the system bus and the CPU local bus. The micro-scheduler operates to schedule operations and/or functions, as well as dynamically control the clock rates, of each of the DSPs and the hardware acceleration logic to achieve the desired throughput while minimizing power consumption. The present invention thus provides a single architecture which has simplified configurability for different digital standards. The configurable digital communications architecture simplifies design and manufacturing costs and provides improved performance over prior designs.

26 Claims, 8 Drawing Sheets

CONFIGURABLE DIGITAL WIRELESS AND WIRED COMMUNICATIONS SYSTEM ARCHITECTURE FOR IMPLEMENTING BASEBAND FUNCTIONALITY

FIELD OF THE INVENTION

The present invention relates to communications systems for wired and wireless environments, and more particularly to a communications architecture for wired and wireless communication environments which is configurable according to a plurality of possible different digital transmission standards.

DESCRIPTION OF THE RELATED ART

Wireless information networks are currently experiencing enormous growth throughout the world. Examples of wireless information networks include cordless telephones, personal communications services (PCS), cellular telephones, paging systems, mobile data networks, and mobile satellite systems. In conjunction with the growth in wireless information networks, communications networks are currently undergoing a transition from analog-based technology to digital technology. Wireless information networks will benefit greatly from digital implementations, including better performance, increased capacity, and a wider offering of services.

Various types of wireless information networks exist, including networks designed for voice and data. In general, different networks exist for voice and data because of the different and often contradictory requirements of voice service and data service. Thus, although digitized voice, video and data are all "binary digits" (bits), each service has different requirements in a digital network. For example, wireless voice data services are required to be comparable to a user's expectation of telephone voice quality in the public switched telephone network (PSTN). Thus, packetized voice service in a wireless network must minimize time delays in transmission. In general, in a voice transmission, interpacket delays in excess of 100 msec are noticeable and annoying to the listener. In contrast, in a data services network, time delays are generally irrelevant to the user. Also, packetized voice service can tolerate packet loss rates on the order of $10^{-2}$, or bit error rates of the same order, without a noticeable degradation of service quality. In contrast, data services require a much lower error rate, and loss of data packets is generally unacceptable. Voice conversations also typically generate Megabytes of digitized information and last at least several minutes, whereas data transfers typically involve less data and are shorter in length.

Thus, wireless information networks typically involve either voice-driven applications such as digital cellular, PCS, cordless telephones, and wireless PBX, or data-driven networks such as wireless LANs and mobile data networks. For voice applications, digital cellular systems are designed to support mobile users roaming over wide geographic areas, whereas PCS, cordless telephones and wireless PBX systems are designed for relatively smaller geographic areas. For data applications, mobile data networks operate a relatively low data rates over urban radio channels, whereas wireless LANs are typically designed to support a limited number of users in a well-defined local area.

Cellular mobile telephone service is one of the most rapidly growing segments of the wireless communications industry. As mentioned above, digital cellular system is designed to support mobile users roaming over wide geographic areas, and thus coverage is provided by an arrangement of cells with a cell size typically 0.5 to 5 miles in diameter. There are currently several digital cellular standards initiatives in the United States, Europe, and Japan, including GSM (Groupe Special Mobile), IS-54, Japanese Digital Cellular (JDC), and Code Division Multiple Access (CDMA). Thus, current digital cellular telephone architectures are required to accommodate a plurality of different digital communication standards.

Current digital cellular telephone architectures generally include a different integrated circuit chip set, particularly in the baseband section, for accommodating each of these digital standards. Each of these different IC chipsets for performing different digital standards is generally only available from a few select companies, thus limiting the amount of product differentiation between manufacturers.

The use of different integrated circuits for each of the digital standards also adversely effects the telephone manufacturing process. As noted above, different market segments generally utilize different digital standards. For example, Europe is primarily based on the GSM standard, whereas the U.S. is primarily based on the IS54 standard. Therefore, for a company to participate in each of these various market segments for cellular telephones, the company is required to maintain multiple production flows, resources, reliability testing, packaging, port assembly and testing requirements for each of the digital standards that are supported. This necessarily leads to high manufacturing costs, which increases the cost of the overall system.

Therefore, an improved configurable architecture for digital communications applications is desired. More particularly, a new baseband architecture for digital communications is desired which provides reduced power consumption and more efficiency in executing the baseband operations of various digital communication standards. A new baseband architecture for digital communications is further desired which is easily configurable between different digital communications standards, thus simplifying the manufacturing process.

SUMMARY OF THE INVENTION

The present invention comprises a configurable multiprocessor communications architecture which performs various digital communications functions and which is configurable for different digital communications standards, such as various digital cellular standards. In the preferred embodiment, the multiprocessor architecture includes, preferably on a single integrated circuit, two or more digital signal processing cores, a microcontroller, a voice coder/decoder (codec), and a relatively low performance central processing unit. Each of the above devices are coupled to a system memory. The configurable digital communications architecture simplifies design and manufacturing costs and provides improved performance over prior designs.

In the preferred embodiment, the digital communications architecture includes one or more processor cores, preferably digital signal processors (DSPs), coupled through a system bus to a common DSP memory or system memory. The common DSP memory stores code and data used by the one or more DSPs. In one embodiment, two or more DSPs are connected to the system bus, and the two or more DSPs are also coupled through dedicated address and data buses. In this embodiment, the two or more DSPs communicate through the dedicated address and data buses without requiring system bus access. In another embodiment, two or more DSPs are daisy chained to the system bus, and one DSP performs system bus accesses for all of the daisy chained DSPs.

A micro-scheduler is coupled to the system bus and operates to schedule operations and/or functions of the one or more DSPs and the hardware acceleration logic. A general purpose CPU is also coupled to the system bus. The general purpose CPU preferably performs user interface functions and overall communications management functions, among others. A CPU local memory and various peripheral devices are coupled through a CPU local bus to the CPU. Specialized hardware acceleration logic, such as for encryption, may also be coupled to the system bus.

A dual port bus arbiter is preferably coupled between the CPU and the system bus and controls CPU access to the system bus and hence to the DSP memory or system memory. Thus the CPU gains access to the system bus and hence to the DSP memory through the dual port bus arbiter. The CPU local bus is preferably coupled between the CPU and the dual port bus arbiter to allow the CPU to access the CPU local memory and the various peripheral devices without having to access the main system bus. In this embodiment, other devices gain access to the CPU local memory through the dual port bus arbiter.

The CPU accesses the DSP memory to store code and data for use by other devices or to pass messages to the micro-scheduler through a semaphore in the memory. The CPU can also access the DSP memory to store code and data to set up operations which are to be performed by the DSPs under control of the micro-scheduler.

Once the micro-scheduler has received a task from the CPU, the micro-scheduler operates to assign different functions or tasks to the one or more DSPs and the hardware acceleration logic to perform the desired communication operation. During this time, the CPU generally does not have access to the system bus, but rather performs operations using its local CPU memory. The micro-scheduler preferably partitions tasks among each of the DSPs and the hardware acceleration logic to achieve the desired throughput while minimizing power consumption. The micro-scheduler also preferably dynamically controls the clock rates of each of the DSPs to achieve a desired computational throughput while minimizing power consumption.

The digital communications architecture of the present invention is configurable between different communications standards and also different communications applications. Thus, for a manufacturer of digital cellular devices, the digital communications architecture of the present invention can be easily programmed to operate according to the GSM standard, the IS54 standard, a CDMA standard, or a TDMA standard, among others. In addition, the digital communications architecture of the present invention can be easily programmed to operate as a digital cellular device, a cordless phone, or a personal communicator in a PCS system.

The configurable communications architecture of the present invention takes advantage of the synergy or commonality in algorithmic performance in the various digital cellular and digital communications standards. The present invention thus essentially provides a modular building block structure for constructing solutions for various digital cellular standards. According to the present invention, the hardware function units comprised in the architecture utilize a common interconnect, i.e. hardware platform, which remains constant. This hardware architecture is sufficiently flexible to be programmable to perform different functions and/or to operate according to different cellular standards. This removes the problems of the telephone manufacturer having to deal with multiple production and sourcing related issues.

The present invention thus provides a single architecture which has simplified configurability for different digital standards. This enables a reduction in telephone manufacturing costs and processes, in addition to simplified silicon design. In other words, the configurable architecture of the present invention utilizes a single hardware architecture for operating according to multiple different cellular standards, thus easing production and sourcing problems. In the preferred embodiment, the telephone manufacturer simply programs code for the appropriate wireless or wired digital cellular standard prior to shipping the final product.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Digital Communications Device

Figure 1:
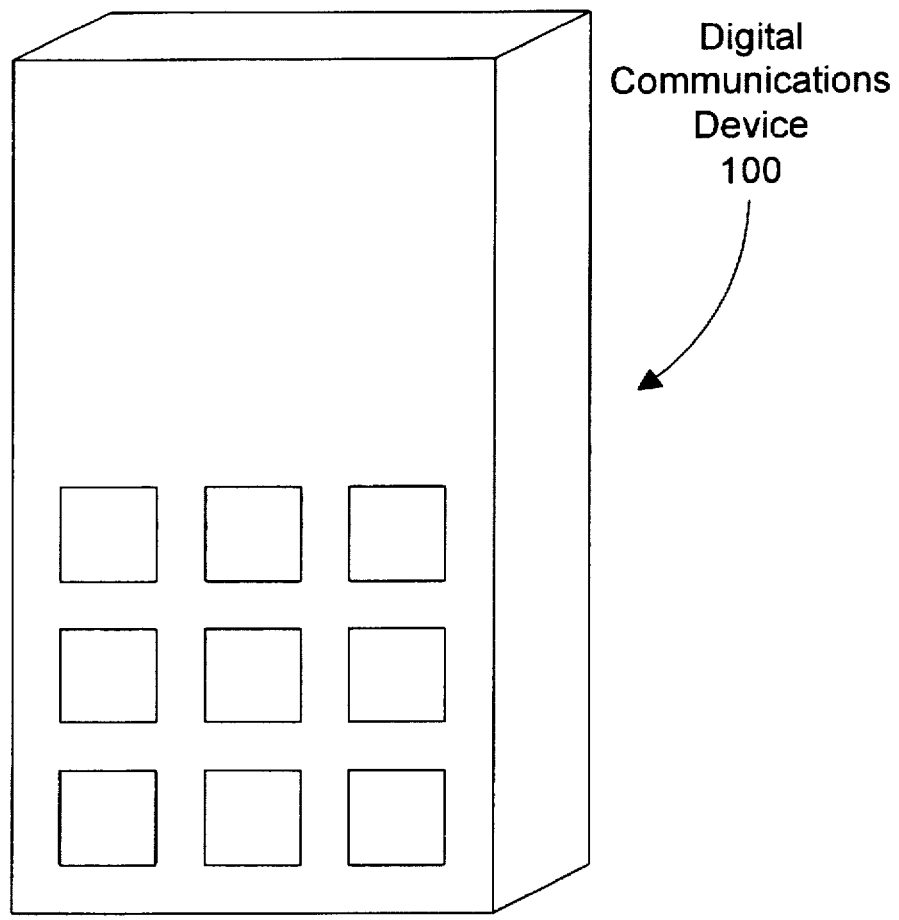
FIG. 1 illustrates a digital communications device which includes a configurable digital cellular architecture according to the present invention.

Referring now to FIG. 1, a digital communications device 100 which includes the configurable digital architecture of the present invention is shown. In the preferred embodiment, the digital communications device 100 is a digital cellular device for wireless communications. However, the digital communications device may comprise other devices, as desired. As discussed below, the digital cellular device 100 is programmable to operate according to a variety of digital cellular standards, including the GSM standard, the IS54 standard, a CDMA standard, or a TDMA standard, among others. In addition, the digital communications architecture of the present invention can be easily programmed to operate as various digital communications devices, including a digital cellular device, a cordless phone, or a personal communicator in a PCS system, among others.

Configurable Architecture Block Diagram

Figure 2:
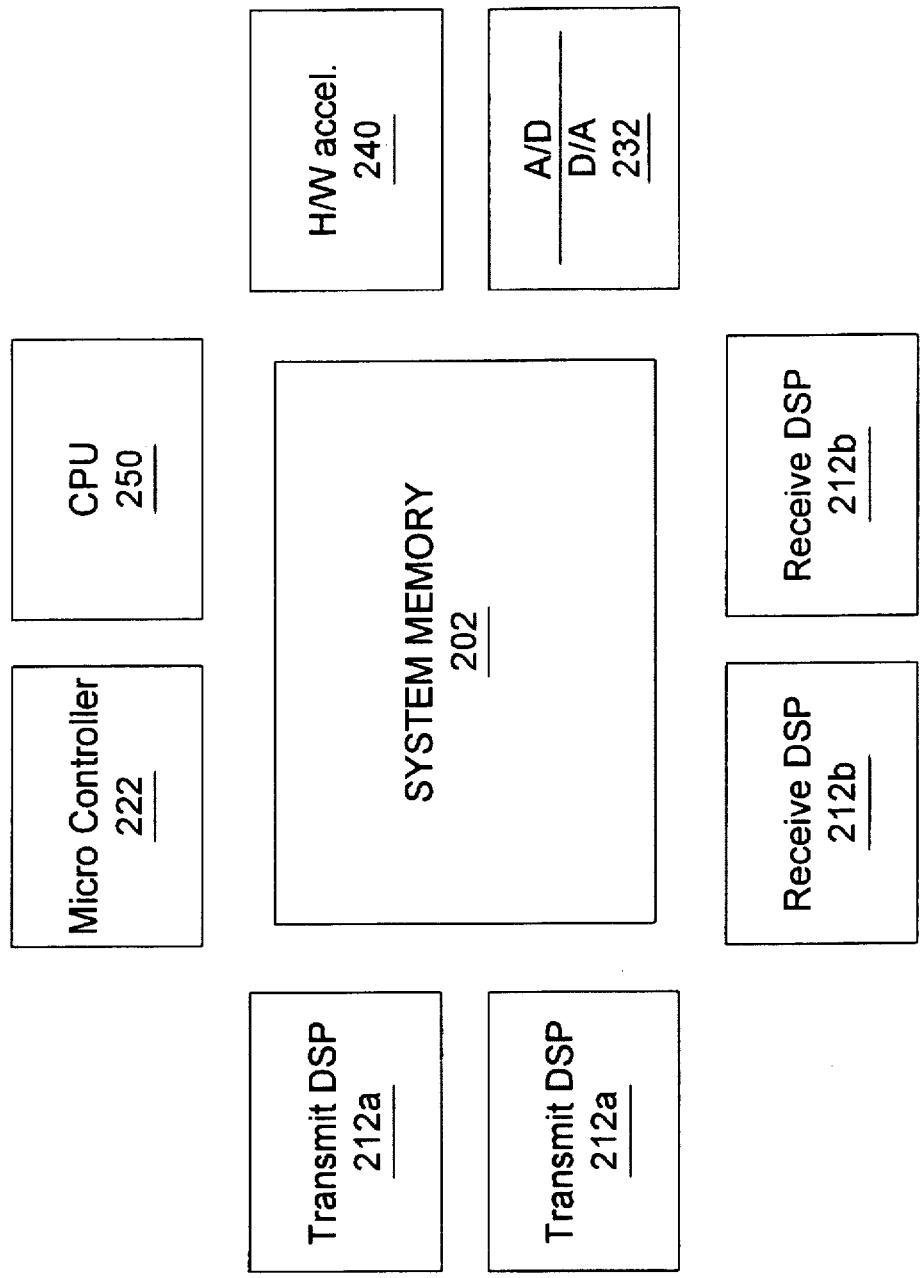
FIG. 2 is a block diagram of the configurable digital cellular architecture of the present invention.

Referring now to FIG. 2, a block diagram illustrating a configurable multiprocessor architecture for digital communication applications is shown. The configurable multiprocessor architecture of the present invention is preferably configurable to operate according to various different digital standards, such as different digital cellular standards. It is noted that FIG. 2 illustrates a portion of the hardware components comprised in the digital communications device 100, such as a digital cellular telephone. Also, the logic components shown in FIG. 2 are preferably comprised on a single monolithic substrate and/or are preferably comprised as a single integrated circuit.

As shown, the communications device 100 includes a memory 202. The memory 202 stores program code and data which enables the communications device 100 to be configurable according to one or more of a plurality of different communication standards. For example, in the preferred embodiment, the memory 202 stores program code and data which enables the communications device 100 to operate according one or more of various digital cellular standards, such as GSM (group special mobile), IS54, and code division multiple access (CDMA), among others.

In one embodiment, the memory 202 is a multiport memory which includes a plurality of read/write ports. This allows multiple devices to simultaneously access the memory 202. In another embodiment, the memory 202 is a single port memory, and the system includes a dual port bus arbiter (FIG. 3) which controls arbitration for the memory 202, as described further below.

As shown, the digital communications device 100 includes one or more digital signal processors 212 coupled to the memory 202 for performing communications functions. In the preferred embodiment of the invention, the architecture includes one or more first digital signal processors 212a which are configured or designated to perform transmit functions, and one or more digital signal processors 212b which are configured to perform receive functions. The embodiment of FIG. 2 includes two first digital signal processors 212a and two second digital signal processors 212b. In the preferred embodiment, the digital communications device architecture includes only one first digital signal processor 212a which performs transmit functions and only one second digital signal processor 212b which performs receive functions.

Each of the DSPs 212 preferably comprises the ADSP 2171 core available from Analog Devices. In the preferred embodiment, the DSP core is preferably comprised of the ADSP 2171 core and includes certain architecture enhancements which provide improvements in the execution of algorithms or functions required for various digital communication standards. These architectural enhancements are discussed further below.

As shown, the system includes a microcontroller or micro-scheduler 222 which operates to control the operation of each of the transmit DSPs 212a and receive DSPs 212b. The micro-scheduler 222 performs scheduling operations to schedule operation of each of the DSPs 212. Micro-scheduler 222 also places the system in one or more desired modes, such as a parallel processing mode where each of the DSPs 212 are operating in parallel, or a master/slave mode where a first DSP 212 is designated as the master and the remaining DSPs 212 are designated as slave DSPs which receive tasks assigned by the master DSP.

Microcontroller 222 preferably is an efficient low power controller which operates as the central sequence or a task scheduler for the entire digital communications architecture. The sequencer or microcontroller 222 is preferably configured in a manner which allows the addition of computational units or DSPs without requiring a redesign of the sequencer or of memory hardware. According to the present disclosure, the term "computational units" is intended to include elements such as digital signal processing cores, custom logic, serial ports, and hardware acceleration logic, among others.

The microcontroller or sequencer 222 preferably controls each of the DSPs 212 and/or computational units in a manner which balances the computational throughput and power consumption based on the application being performed. Thus the microcontroller 222 preferably balances the tasks or functions assigned to each DSP 212 depending on the amount of computational throughput required. The microcontroller 222 also preferably controls the clock rate of each of the DSPs depending on the computational throughput and power consumption. Thus, for a computational intensive task which requires immediate response, the micro-scheduler 222 partitions the task among two or more DSPs or computational units, and operates the two or more DSPs or computational units at a full clock rate. For tasks which are not computationally intensive, the micro-scheduler 222 partitions the task among one or more of the DSPs or computational units, and operates the one or more DSPs or computational units at a slower clock rate to reduce power consumption.

In one embodiment, the microcontroller or sequencer 222 is an ARM-like processor, which acts as the central sequencer/controller. In this embodiment, software used to program the microcontroller 222 is preferably written in C or in similar higher level language using currently available development tools, i.e. C compilers, simulators, and debuggers. This provides a high level development platform for performing the design of the digital communications device, and also provides flexibility for changes or new features.

The system preferably includes a general purpose CPU 250 which acts as the overall controller of the system. The CPU 250 comprised in the system of the present invention communicates with the micro-scheduler 222 and provides communications tasks to the micro-scheduler 222. The CPU 250 also preferably performs user interface functions, receiving and processing user commands. In one embodiment, the CPU 250 performs an intelligent multi-mode configurable communicator application. In other words, in one embodiment the CPU 250 executes an application which enables the digital communications device to operate according to different desired modes or digital standards. The CPU 250 also preferably implements various protocol stacks as appropriate due to the variability and the various standard specifications.

As shown, the digital communications system includes analog to digital conversion logic 230 and digital to analog conversion logic 232. The analog to digital (A/D) conversion logic 230 receives analog signals and provides corresponding digital signals to either one or more of the digital signal processors 212, 214, the CPU 250 or to the memory 202. The digital to analog (D/A) conversion logic 232 receives digital signals from the DSPs 212 or 214 or from the memory 202 and provides corresponding analog signals output from the communication device.

The digital communications device also preferably includes hardware acceleration logic for performing certain tasks and hardware. The hardware accelerator logic 240 preferably performs functions such as data coding or encryption, or other functions which require specialized or dedicated hardware.

Common Hardware for Different Digital Cellular Standards

As mentioned above, the configurable digital communications architecture shown in FIG. 2 is configurable according to various communications standards. The present invention takes advantage of the commonality of functional requirements between each of the digital cellular standards.

In general, each digital cellular standard includes a baseband section comprising baseband logic for performing operations on the voice or data signals at the baseband frequency level. A typical baseband transmission block includes voice coding, channel coding, protocol handling, and modulation functions. Voice coding algorithms are generally based on code excited linear prediction methods. The voice coding algorithms used for each of the different cellular standards typically differ in bit rates, code books and error control used in the linear prediction voice coding algorithm. However, each of these voice coding algorithms are similar in execution and complexity from a computational standpoint. Channel coding and protocol stack functions are also similar in concept for each of the different digital cellular standards. However, differences exist in the length of the convolutional coding elements, trellis coding and viterbi decoding. The modulation used by the baseband sections of each of the digital cellular standards typically use well-known quaternary phase shift keying (QPSK) or GMSK modulation schemes.

Once voice signals have been digitized in a digital cellular voice call, the transmission flow resembles operation of a high speed modem. In a wired medium, the propagation channel is generally time invariant, whereas in the wired medium the propagation channel is time varying.

The design of the receiver station of both wired and wireless media generally has similar architecture features. However, the wireless receiver is generally far more complex in order to handle multipath fading characteristics of the channel. In analyzing the transmit and receive sections of a digital cellular architecture, it is apparent that the speech encoding algorithm in the transmit section requires the most computations and complexity. The receive section is dominated by channel equalization and viterbi estimation.

According to the configurable digital communication architecture of the present invention, the wireless and wired modem architectures are treated in a similar manner, thus producing a number of significant advantages. One advantage is that the transmission path can now be broken into two distinct sections, i.e., the transmit block can be treated as an independent block from the receive section.

As discussed above, prior art systems employ a single digital signal processor to execute the complete baseband functionality of a digital communications device. This inherently leads to high power consumption, high clock rates and excessive overhead in maintaining program flow and interrupts. Memory design also becomes an issue at higher clock rates.

The present invention provides a new communication architecture for digital communications which provides reduced power consumption and more efficiency in executing the baseband operations of various digital communication standards. As mentioned above, the system of the present invention includes two or more DSPs or computational units 212 and also includes a micro-scheduler 222 which dynamically assigns tasks and clock rates to achieve a desired computational throughput with reduced power consumption. This enables the use of lower clock rates in the system, thus reducing power requirements.

Also, by partitioning the communication functions, such as transmit and receive functions, between multiple processors, under the command of a controller, functional units in the digital communication system can operate in various modes, such as in a parallel processor mode or in a master/slave mode. Further, due to the use of multiple processors performing separate functions, the system can operate at lower clock rates which are sufficient to implement the required functionality. This enables power consumption to be controlled more easily. The present invention further includes circuit design techniques which further reduce power dissipation.

The multiprocessor architecture of the present invention also preferably utilizes one or more transmit digital signal processors 212a and one or more receive digital signal processors 212b. The transmit DSPs 212a perform the transmit function, whereas the receive DSPs 212b perform the receive function. Implementation of the transmit and the receive functions in different digital signal processors provides flexibility and scalability.

The overall architecture is also programmable or configurable according to various different digital communication standards and voice coding algorithms. This configurability allows the manufacturer to produce one hardware architecture which can then be configured according to various desired standards. This obviates the necessity of the telephone manufacturer having to deal with multiple production and sourcing related issues.

Figure 3:
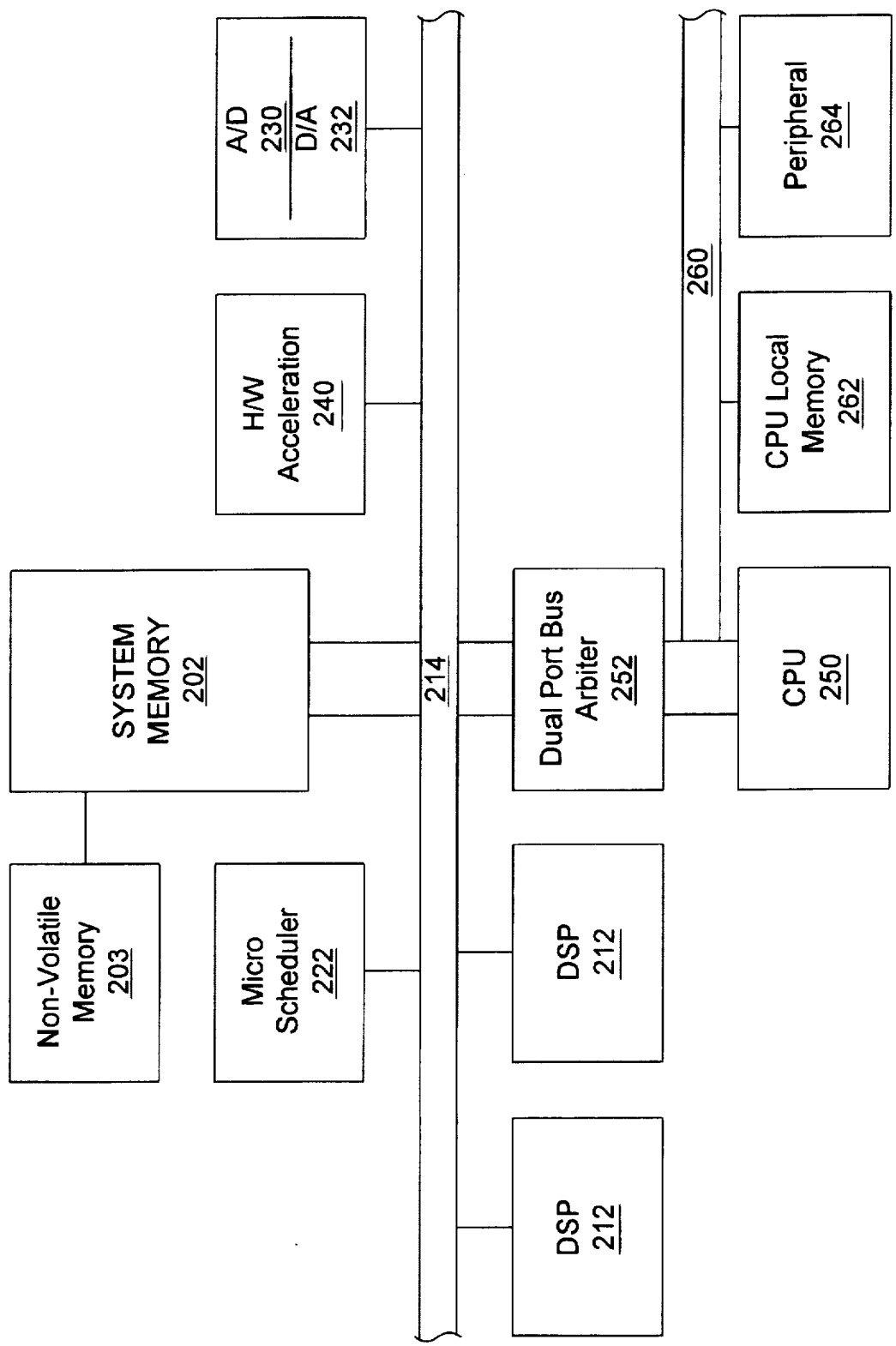
FIG. 3 is a more detailed block diagram of the configurable digital cellular architecture of the preferred embodiment.

FIG. 3—Block Diagram

Referring now to FIG. 3, a more detailed block diagram illustrating the preferred embodiment of the invention is shown. Elements in FIG. 3 which are similar or identical to elements in FIG. 2 have the same reference numerals for convenience. The elements or components shown in FIG. 3 are preferably all comprised on a single monolithic silicon substrate and/or are preferably comprised as a single integrated circuit.

As shown, the digital communications system includes one or more processor cores 212 coupled through a bus 214 to a common DSP memory or system memory 202. The processor cores 212 are preferably digital signal processors, although other types of processor units may be used. In the preferred embodiment, the system includes two DSPs 212, although a greater or lesser number of DSPs may be used.

Specialized hardware acceleration logic 240 may also be coupled to the bus 214. The hardware acceleration logic 240 is included to perform certain functions in dedicated hardware due to computational requirements. In the preferred embodiment, the hardware acceleration logic 240 performs data encryption operations.

Microcontroller or micro-scheduler 222 is coupled to the bus 214 and operates to schedule operations and/or functions of the one or more DSPs 212 and the hardware acceleration logic 240. A general purpose CPU 250 is also coupled to the bus 214. The general purpose CPU 250 preferably performs user interface functions and overall communications management functions, among others.

The digital communications system includes analog to digital conversion logic 230 and digital to analog conversion logic 232. The analog to digital (A/D) conversion logic 230 receives analog signals and provides corresponding digital signals to either one or more of the digital signal processors 212, 214, the CPU 250 or to the memory 202. The digital to analog (D/A) conversion logic 232 receives digital signals from the DSPs 212 or 214 or from the memory 202 and provides corresponding analog signals output from the communication device. The A/D logic 230 and the D/A logic 232 are primarily used for converting analog speech signals to digital signals, and for converting digital speech signals to analog speech signals. In one embodiment, the A/D logic 230 and the D/A logic 232 are comprised in a voice coder / decoder (codec).

The common DSP memory or system memory 202 stores code and data used by the one or more DSPs 212, as well as for the hardware acceleration logic 240, the micro-scheduler 222, and the CPU 250.

A non-volatile memory 203 is coupled to the system memory 202 and stores code and data necessary to implement one or more digital cellular standards. Code and data is programmed into the non-volatile memory 203 by the manufacturer to program or configure the system according to a desired digital standard, such as a digital cellular standard. At power-up, the code and data from the non-volatile memory 203 is preferably transferred to the system memory 202 for use within the system. In one embodiment, code and data for two or more digital cellular standards are programmed into the non-volatile memory 203, and the user can selectively configure the digital communications device according to one of these desired digital cellular standards, depending on the location where the device is used.

A bus arbiter 252, referred to as a dual port bus arbiter 252, is preferably coupled between the CPU 250 and the bus 214 and controls access to the bus 214 and hence to the system memory 202. A CPU local memory 262 and various peripheral devices 264 are coupled through a CPU local bus 260 to the CPU 250. The CPU local bus 260 is coupled between the CPU 250 and the dual port bus arbiter 252 to allow the CPU 250 to access the CPU local memory 262 and the various peripheral devices 264 without having to access the main system bus 214. The non-volatile memory 203 may be coupled to the CPU local memory 262 for providing code and data to the CPU local memory 262 during power-on. As mentioned above, the non-volatile memory 203 stores code and data which allows the digital communications device to operate according to a desired digital cellular standard.

As mentioned above, the dual port bus arbiter 252 controls access to the system bus 214 and hence to the system memory or DSP memory 202. The CPU 250 accesses the system memory 202 to store code and data for use by other devices or to pass messages to the micro-scheduler 222 through a semaphore in the system memory 202. The CPU 250 also accesses the DSP memory 202 to store code and data to set up operations which are to be performed by the DSPs 212 under control of the micro-scheduler 222.

Once the micro-scheduler 222 has received a task from the CPU 250, the micro-scheduler operates to assign different functions or tasks to the one or more DSPs 212 and the hardware acceleration logic 240 to perform the desired communication operation. During this time, the CPU 250 generally does not have access to the system bus 214, but rather performs operations using its local CPU memory 262. Thus, after the CPU 250 accesses the memory 202 to set up a transmit or receive operation, the micro-scheduler 222 gains access to the bus 214 to access the memory 202 and assign tasks to different DSPs 212. The CPU 250 operates out of its CPU local memory 262 during this time that it is "locked out" of the memory 202.

Thus the dual port bus arbiter 252 controls access to the system bus 214 and hence to the DSP memory 202. Once the CPU 250 has set up an operation and relinquished control to the micro-scheduler 222, the dual port bus arbiter 252 controls access to the system bus 214 between the micro-scheduler 222, the DSPs 212, and the hardware acceleration logic 240.

In one embodiment, the dual port bus arbiter 252 also controls access to the CPU local memory 262 from other devices, such as the micro-scheduler 222. Thus when the micro-scheduler 222 desires to read or write a location in the CPU local memory 262, the micro-scheduler 222 requests access to the CPU local bus 260 through the dual port bus arbiter 252. The CPU 250 has priority access to the CPU local bus 260.

The digital communications architecture of the present invention is configurable between different communications standards and also different communications applications. Thus, for a manufacturer of digital cellular devices, the digital communications architecture of the present invention can be easily programmed to operate according to the GSM standard, the IS54 standard, a CDMA standard, or a TDMA standard, among others. In addition, the digital communications architecture of the present invention can be easily programmed to operate as a digital cellular device, a cordless phone, or a personal communicator in a PCS system.

The configurable multiprocesser architecture of the present invention takes advantage of the synergy or commonality in algorithmic performance in the various digital cellular and digital communications standards. The present invention thus essentially provides a modular building block structure for constructing solutions for various digital cellular standards. According to the present invention, the hardware function units comprised in the architecture utilize a common interconnect, i.e. hardware platform, which remains constant. This hardware architecture is sufficiently flexible to be programmable to perform different functions and/or to operate according to different cellular standards. This removes the problems of the telephone manufacturer having to deal with multiple production and sourcing related issues.

Flowchart Diagram

Figure 4:
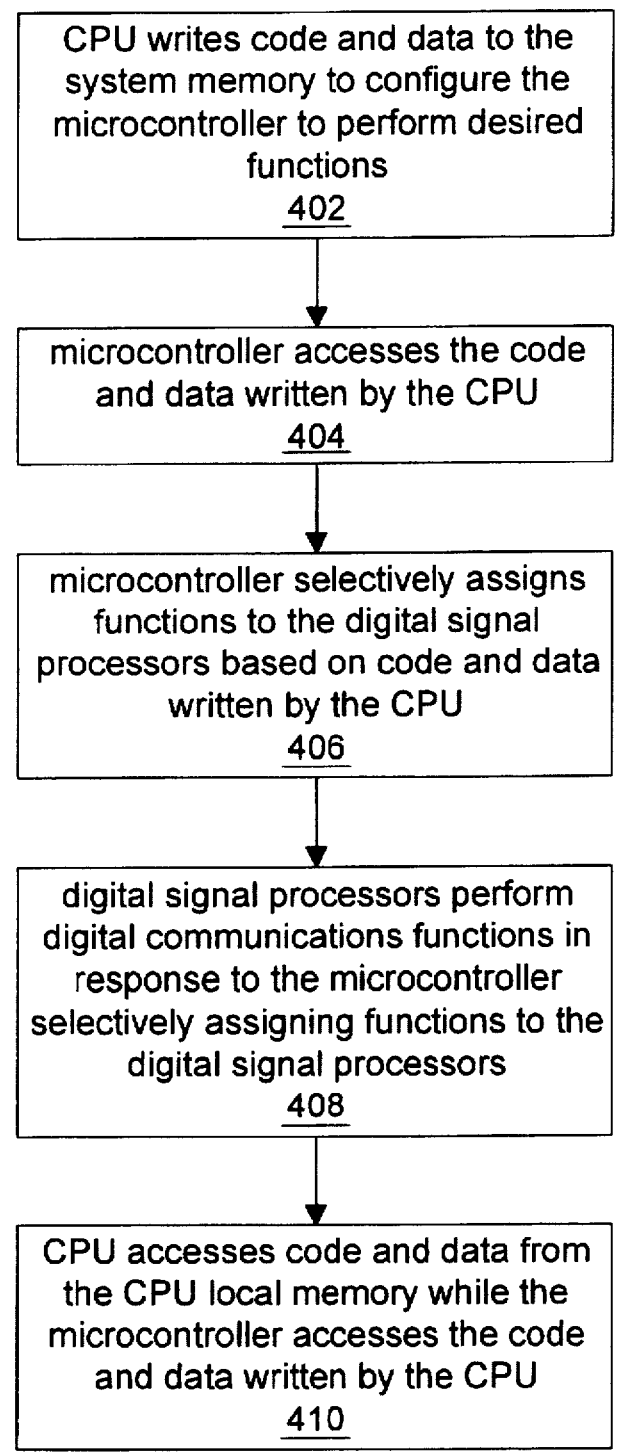
FIG. 4 is a flowchart diagram illustrating operation of the present invention.

Referring now to FIG. 4, a flowchart diagram illustrating operation of the preferred embodiment of the present invention is shown.

As shown, in step 402 the CPU writes code and data to the system memory 202 to configure the microcontroller 222 to perform desired functions. Thus in step 402 the CPU 250 sets up a communications function, such as a transmit or receive function, by writing the appropriate code and data to the system memory 202. This code and data provides the necessary information which enables the microcontroller 222 to begin a communications function.

In step 404 the microcontroller 222 accesses the code and data written by the CPU 250 from the system memory 202. In step 406 the microcontroller selectively assigns functions to the one or more digital signal processors 212 based on the code and data written by the CPU 250. Thus the microcontroller or micro-scheduler 222 acts to assign functions or tasks to one or more of the DSPs based on the function being performed. In step 408 the one or more digital signal processors 212 perform digital communications functions in response to the microcontroller 222 selectively assigning functions to the one or more digital signal processors 212. It is noted that, during this time, the CPU 250 accesses code and data from the CPU local memory 262 in step 410. Thus the micro-scheduler 222 acts to assign functions or tasks to the one or more of the DSPs in step 408 substantially contemporaneously with the CPU 250 accessing code and data from the CPU local memory 262 in step 410.

The microcontroller 222 preferably selectively assigns tasks to each of the one or more digital signal processors 212 to attain a desired computational throughput while also minimizing power consumption. Each of the one or more digital signal processors is configurable to operate at one of a plurality of different clock rates. In the preferred embodiment, the microcontroller 222 selectively controls the clock rates of each of the one or more digital signal processors 212 to reduce or minimize power consumption. Thus, the microcontroller 222 may assign a task to only one DSP 212 and operate the DSP 212 at its full clock rate to perform the task. The microcontroller 222 may also partition the task between two or more of the DSPs 212 and operate each of the DSPs 212 at half their full clock rate to perform the task in order to reduce power consumption.

Programming the System according to a Desired Digital Standard

In order to program the hardware system of FIG. 3 according to a desired digital communications standard, such as a digital cellular standard, code and data is stored or written into non-volatile memory 203 which is coupled to the system memory 202. The code and data stored in the non-volatile memory 203 is in accordance with the digital standard. Thus, if it is desired to program the system for the GSM digital cellular standard, code and data is programmed into the non-volatile memory 203 which performs operations according to this digital standard. Upon power-up, the code and data stored in the non-volatile memory 203 is transferred to the system memory 202 for use in the system. Code and data stored in the non-volatile memory 203 may also be transferred to the CPU local memory 262 for execution by the CPU. Alternatively, a separate non-volatile storage memory (not shown) is coupled to the CPU local memory 262 for providing code and data to the CPU local memory 262 during power-up.

Figure 5:
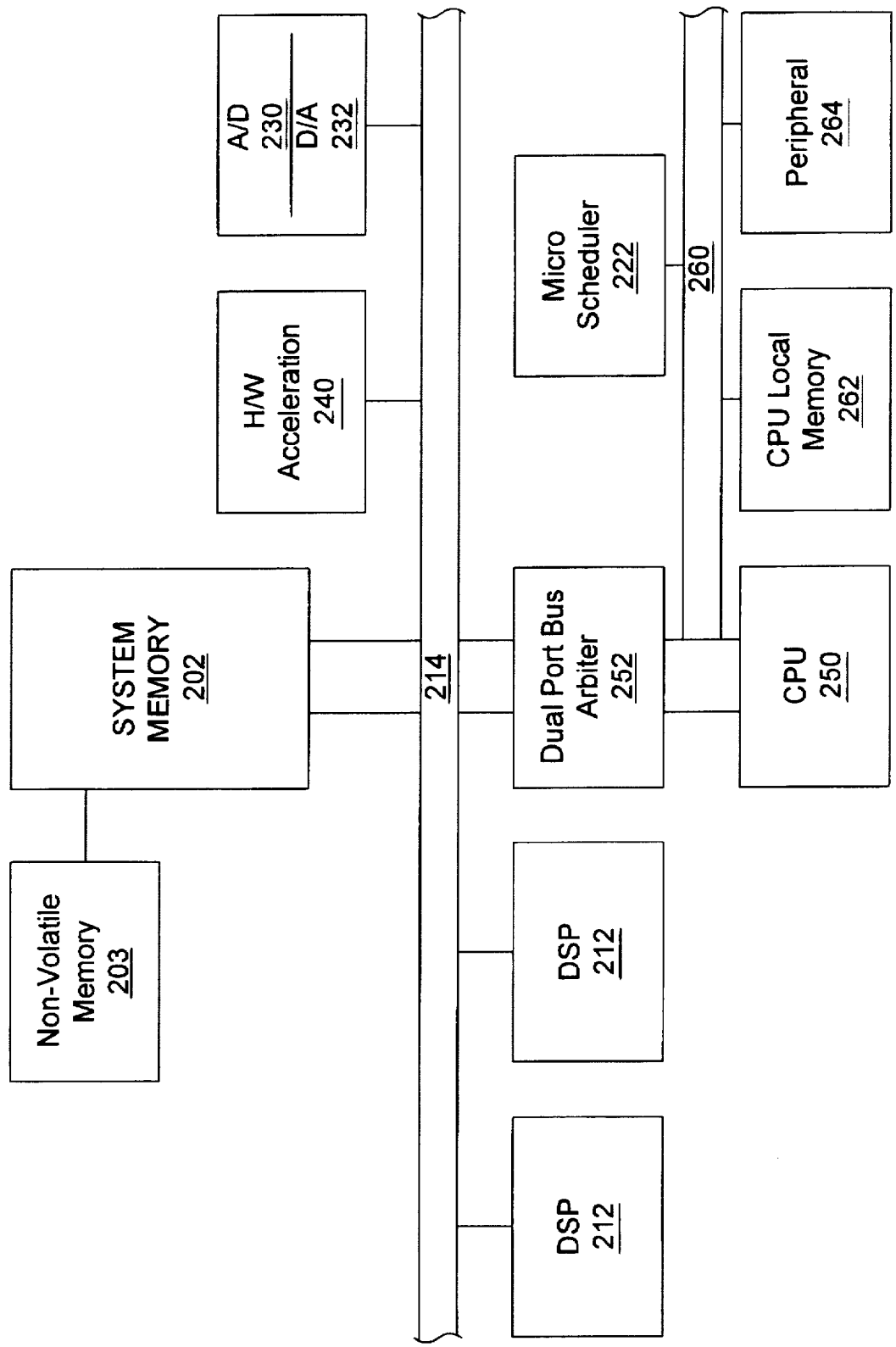
FIG. 5 illustrates an alternate embodiment where the micro-scheduler is coupled to the CPU local bus.

FIG. 5—Micro-scheduler coupled to CPU Local Bus (Alternate Embodiment)

Referring now to FIG. 5, an alternate embodiment of the invention is shown. In the embodiment of FIG. 5, the micro-scheduler or microcontroller 222 is coupled to the CPU local bus 260. This enables the CPU 250 and the microcontroller 222 to communicate on the CPU local bus 260, thus freeing up the system bus 214 for use by the DSPs 212. The microcontroller 222 accesses the system bus 214 and hence the system memory 202 through the dual port bus arbiter 252. The microcontroller 222 preferably uses the CPU local memory 262 for operations and writes code and data to the system memory 202 to assign functions or tasks to the DSPs 212.

Figure 6:
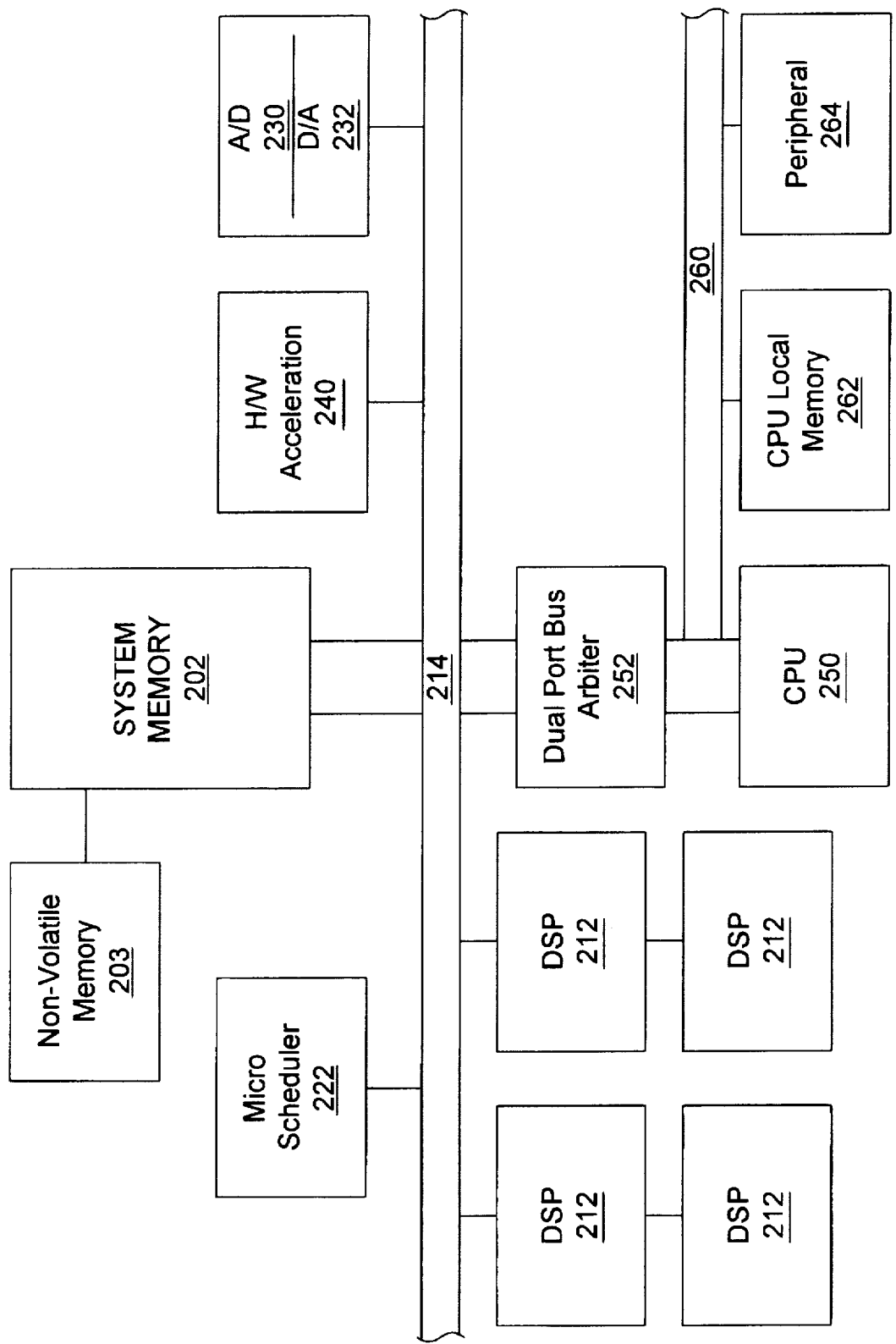
FIG. 6 illustrates an alternate embodiment where two sets of two DSPs are coupled to the system bus in a daisy chain fashion.

FIG. 6—DSP Daisy Chain Embodiment

Referring now to FIG. 6, an alternate embodiment of the invention is shown. In the embodiment of FIG. 6, two or more DSPs 212 are coupled to the system bus 214 in a daisy chain format. In other words, a first DSP 212 is coupled to the system bus 214, and a second DSP 212 is coupled to the first DSP 212. In the embodiment of FIG. 6, two sets or groups of first and second DSPs are shown coupled to the system bus 214. For each group of first and second DSPs, the first DSP 212 accesses code and data from the system memory 202 that is required for both of the first and second DSPs 212. This limits the required accesses to the system bus 214 and hence to the system memory 202.

Thus, in this embodiment, only the first DSP 212 in a group of two or more DSPs is assigned a task by the microcontroller 222. In response, the first DSP 212 reads code and data from the system memory 202 that is required for both of the first and second DSPs 212 in the group. The first DSP 212 then partitions tasks between the first and second DSPs 212. The first and second DSPs 212 operate in either a parallel processing mode or a master/slave mode to accomplish the assigned task, using the code and data retrieved by the first DSP 212.

Figure 7:
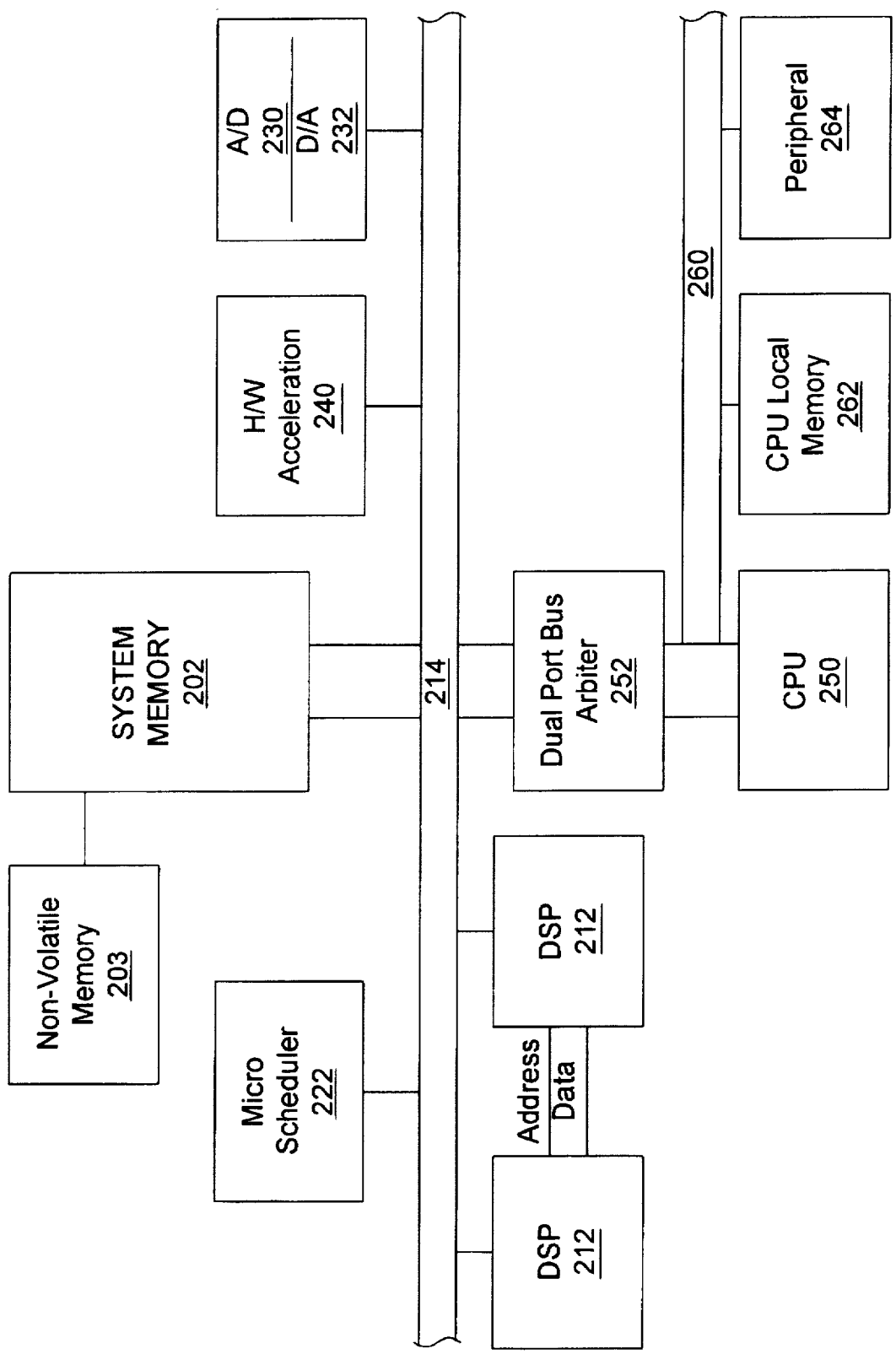
FIG. 7 illustrates an alternate embodiment where two DSPs are coupled to the system bus and are also coupled through dedicated address and data lines.

FIG. 7—Dedicated DSP Buses (Alternate Embodiment)

Referring now to FIG. 7, an alternate embodiment of the invention is shown. In the embodiment of FIG. 7, two or more DSPs 212 are coupled to the system bus 214, and the system includes dedicated address and data buses coupled between the two or more DSPs 212. This enables the two or more DSPs 212 to communicate via the dedicated address and data buses without having to access the system bus. For example, this facilitates the operation of the two or more DSPs 212 in a master/slave mode or a parallel processing mode. For more information on this embodiment, please see EPO patent number 0465054, and U.S. patent application Ser. No. 07/548,709, which are both hereby incorporated by reference as though fully set forth herein.

In one embodiment of the invention, each of the DSPs 212 include a separate local memory (not shown), and each of the DSPs 212 execute code and data out of their respective local memories. This reduces the arbitration and contention for the system memory 202. The DSP local memories in this embodiment are also used for communication between each of the DSPs, using the dedicated address and data buses.

Figure 8:
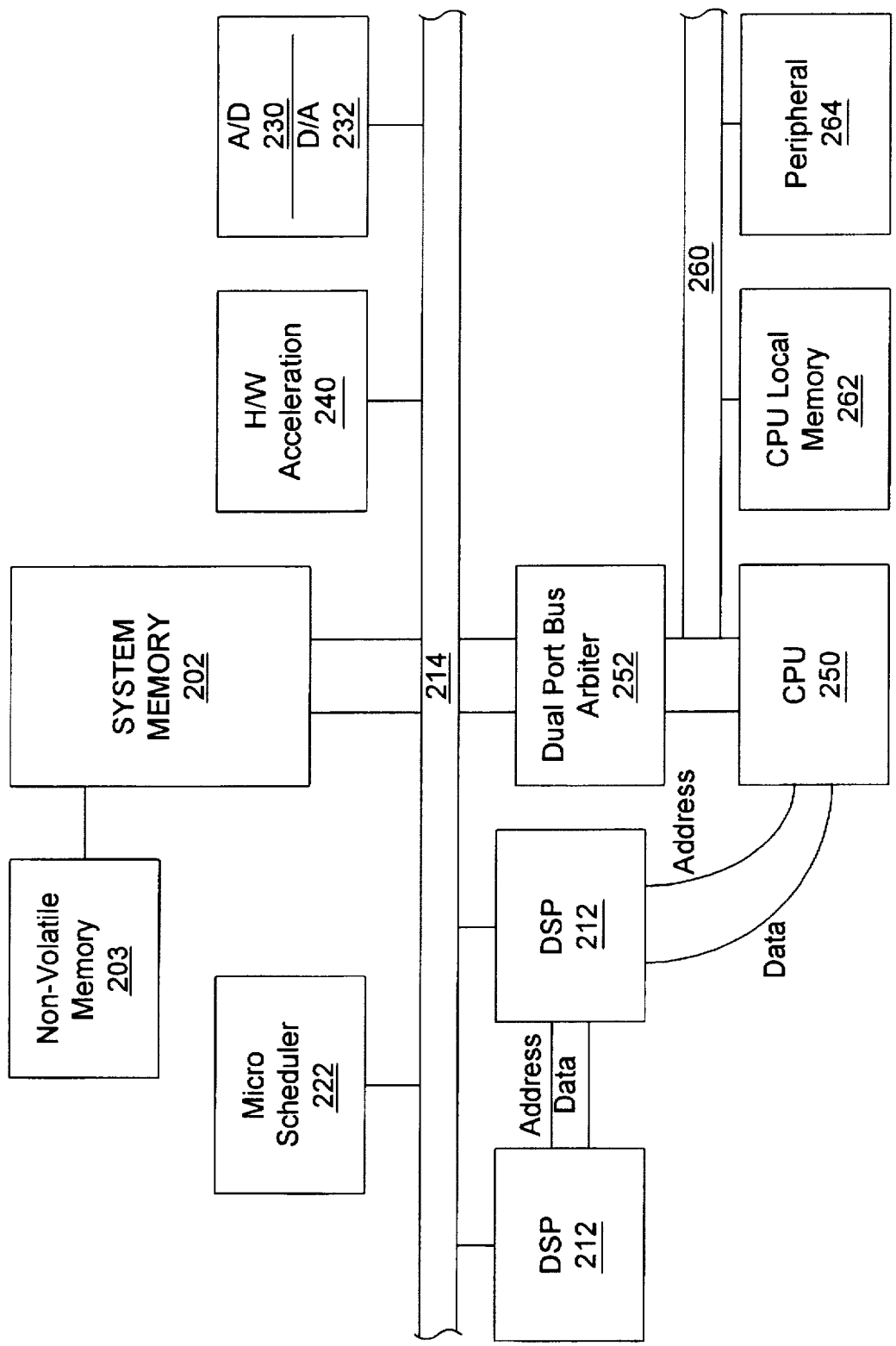
FIG. 8 illustrates an alternate embodiment where two DSPs and the CPU are coupled to the system bus and are also coupled through dedicated address and data lines.

FIG. 8—Dedicated Buses Between DSPs and CPUs (Alternate Embodiment)

Referring now to FIG. 8, an alternate embodiment of the invention is shown. In the embodiment of FIG. 7, two or more DSPs 212 are coupled to the system bus 214, and the system includes dedicated address and data buses coupled between the two or more DSPs 212 and the CPU 250. This enables the two or more DSPs 212 and the CPU 250 to communicate via the dedicated address and data buses without having to access the system bus.

In another embodiment (not shown), the system includes dedicated address and data buses coupled between the two or more DSPs 212 and the micro-scheduler 222. This enables the micro-scheduler 222 to more easily assign tasks, such as passing commands and data, to the two or more DSPs 212.

DSP Functional Enhancements to the ADSP Architecture

In the preferred embodiment, each of the DSPs 212 comprises the ADSP 2171 core available from Analog Devices. As noted above, in the preferred embodiment the DSP core is preferably comprised of the ADSP 2171 core and includes certain architecture enhancements which provide improvements in the execution of algorithms or functions required for various digital communication standards. These architectural enhancements are listed below.

1. Shadowing of Address Generation Registers.
2. Shadowing of all Registers to 2 levels.
3. Register File to separate Dual Memories from Functional Units.
4. Using a register file to separate dual memories from functional units allows Parallel Operation of Functional Units, including pipelining the ALU with the MAC and pipelining the ALU with the Shifter. This also supports Table Search Algorithms.
5. Exploit Internal DRAM spare cycles for Data I/O.
6. Enhanced Instructions to Support Channel Coding/Decoding: Data Compare and Pointer Save.
7. Post and Pre scaling for MAC operations to allow easier Data Normalisation.

These features are added to the ADI Architecture at a cost of increasing Instruction word length and memory architecture. Also, the ability to add/subtract functional units tailored to particular applications and modifying the instruction set accordingly provides a more modular approach to the DSP Architecture and allows cost-effective solutions in price-sensitive markets. Support tools may also be provided to cover these enhancements to allow ease of programmability for embedded applications.

Conclusion

The present invention thus provides a single architecture which has simplified configurability for different digital standards. This enables a reduction in telephone manufacturing costs and processes, in addition to simplified silicon design. In other words, the configurable architecture of the present invention utilizes a single hardware architecture for operating according to multiple different cellular standards, thus easing production and sourcing problems. In the preferred embodiment, the telephone manufacturer simply programs code for the appropriate wireless or wired digital cellular standard prior to shipping the final product.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

one or more digital signal processors (DSPs) coupled to the system bus for performing communication functions;

a microcontroller coupled to said system bus which controls operations of said one or more digital signal processors, wherein the microcontroller is configured to access code and data from the system memory, wherein the microcontroller is configured to control operations of the one or more digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a bus arbiter coupled to the system bus which controls arbitration and access to the system bus, wherein the bus arbiter is configured to receive requests from each of the microcontroller and the CPU for access to the system bus and selectively grant control of the system bus to one of either the microcontroller or the CPU;

a CPU local memory coupled to the CPU, wherein the CPU local memory stores code and data used by the CPU for performing communication control operations;

wherein the CPU is operable to write code and data to the system memory to configure the microcontroller to perform desired functions; and wherein the microcontroller is configured to read said code and data written by the CPU and selectively assign functions to the one or more digital signal processors based on said code and data written by the CPU.

2. The digital wireless communication system of claim 1, wherein the bus arbiter is a dual port bus arbiter, wherein the dual port bus arbiter is coupled between the system bus and the CPU, wherein the CPU local memory is coupled between the dual port bus arbiter and the CPU, wherein the dual port bus arbiter is also configured to receive requests from each of the microcontroller and the CPU for access to the CPU local memory, wherein the dual port bus arbiter selectively grants access to the CPU local memory to one of either the microcontroller or the CPU.

3. The digital wireless communication system of claim 1, wherein the microcontroller is configured to selectively assign tasks to each of said one or more digital signal processors to attain a desired computational throughput.

4. The digital wireless communication system of claim 1, wherein each of said one or more digital signal processors is configurable to operate at a clock rate, wherein the microcontroller is configured to selectively control the clock rates of each of said one or more digital signal processors to reduce power consumption.

5. The digital wireless communication system of claim 1, wherein the CPU is operable to access code and data from the CPU local memory while the microcontroller accesses code and data from the system memory.

6. A digital wireless communication system for performing communications according to one of a plurality of different digital standards, wherein the system is configurable to operate according to different ones of said plurality of digital standards, comprising, on a single integrated circuit:

a system bus for transmitting code and data;

system memory coupled to the system bus for storing code and data;

one or more digital signal processors (DSPs) coupled to the system bus for performing communication functions;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a bus arbiter coupled between the system bus and the CPU which controls arbitration and access to the system bus;

a CPU local bus coupled between the CPU and the bus arbiter;

a CPU local memory coupled to the CPU local bus, wherein the CPU local memory stores code and data used by the CPU for performing communication control operations; and a microcontroller coupled to the CPU local bus which controls operations of said one or more digital signal processors, wherein the microcontroller is configured to access code and data from the CPU local memory, wherein the microcontroller is configured to control operations of the one or more digital signal processors;

wherein the bus arbiter is configured to receive requests from each of the microcontroller and the CPU for access to the system bus and selectively grant control of the system bus to one of either the microcontroller or the CPU;

wherein the CPU is operable to write code and data to the system memory to configure the microcontroller to perform desired functions; and wherein the microcontroller is configured to read said code and data written by the CPU and selectively assign functions to the one or more digital signal processors based on said code and data written by the CPU.

7. The digital wireless communication system of claim 6, wherein the microcontroller is configured to selectively assign tasks to each of said one or more digital signal processors to attain a desired computational throughput.

8. The digital wireless communication system of claim 6, wherein each of said one or more digital signal processors is configurable to operate at a clock rate, wherein the microcontroller is configured to selectively control the clock rates of each of said one or more digital signal processors to reduce power consumption.

9. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

at least two digital signal processors (DSPs) coupled to the system bus for performing communication functions;

one or more address/data buses coupled between the at least two DSPs for communicating data between the at least two DSPs;

a microcontroller coupled to said system bus which controls operations of said at least two digital signal processors, wherein the microcontroller is configured to access code and data from the system memory, wherein the microcontroller is configured to control operations of the at least two digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a bus arbiter coupled to the system bus which controls arbitration and access to the system bus, wherein the bus arbiter is configured to receive requests from each of the microcontroller and the CPU for access to the system bus and selectively grant control of the system bus to one of either the microcontroller or the CPU;

a CPU local memory coupled to the CPU, wherein the CPU local memory stores code and data used by the CPU for performing communication control operations;

wherein the CPU is operable to write code and data to the system memory to configure the microcontroller to perform desired functions;

wherein the microcontroller is configured to read said code and data written by the CPU and selectively assign functions to the one or more digital signal processors based on said code and data written by the CPU.

10. The digital wireless communication system of claim 9, wherein the bus arbiter is a dual port bus arbiter, wherein the dual port bus arbiter is coupled between the system bus and the CPU, wherein the CPU local memory is coupled between the dual port bus arbiter and the CPU, wherein the dual port bus arbiter is also configured to receive requests from each of the microcontroller and the CPU for access to the CPU local memory, wherein the dual port bus arbiter selectively grants access to the CPU local memory to one of either the microcontroller or the CPU.

11. The digital wireless communication system of claim 9, wherein the microcontroller is configured to selectively assign tasks to each of said one or more digital signal processors to attain a desired computational throughput.

12. The digit wireless communication system of claim 9, wherein each of said one or more digital signal processors is configurable to operate at a clock rate, wherein the microcontroller is configured to selectively control the clock rates of each of said one or more digital signal processors to reduce power consumption.

13. The digital wireless communication system of claim 9, further comprising:

one or more address/data buses coupled between one or more of the DSPs and the CPU for communicating data between one or more of the DSPs and the CPU.

14. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

a first digital signal processor (DSP) coupled to the system bus for performing communication functions;

a second DSP coupled to the first DSP, wherein the second DSP is not directly connected to the system bus, wherein the first DSP performs system memory accesses to retrieve code and data used by both of the first and second DSPs;

a microcontroller coupled to said system bus which controls operations of said at least two digital signal processors, wherein the microcontroller is configured to access code and data from the system memory, wherein the microcontroller is configured to control operations of the at least two digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a bus arbiter coupled to the system bus which controls arbitration and access to the system bus, wherein the bus arbiter is configured to receive requests from each of the microcontroller and the CPU for access to the system bus and selectively grant control of the system bus to one of either the microcontroller or the CPU;

a CPU local memory coupled to the CPU, wherein the CPU local memory stores code and data used by the CPU for performing communication control operations;

wherein the CPU is operable to write code and data to the system memory to configure the microcontroller to perform desired functions; and wherein the microcontroller is configured to read said code and data written by the CPU and selectively assign functions to the one or more digital signal processors based on said code and data written by the CPU.

15. The digital wireless communication system of claim 14, wherein the microcontroller is configured to selectively assign tasks to each of said one or more digital signal processors to attain a desired computational throughput.

16. The digital wireless communication system of claim 14, wherein each of said one or more digital signal processors is configurable to operate at a clock rate, wherein the microcontroller is configured to selectively control the clock rates of each of said one or more digital signal processors to reduce power consumption.

17. A method for performing digital communications functions in a digital communications device comprising a system memory, a dual port bus arbiter coupled to the system memory which controls arbitration and access to the system memory, one or more digital signal processors (DSPs) coupled to the system memory, a microcontroller coupled to the system memory, and a CPU coupled to the system memory, the method comprising:

the dual port bus arbiter receiving requests from each of the microcontroller and the CPU for access to the system bus;

the dual port bus arbiter selectively granting control of the system bus to one of either the microcontroller or the CPU;

the CPU writing code and data to the system memory to configure the microcontroller to perform desired functions;

the microcontroller accessing the code and data written by the CPU;

the microcontroller selectively assigning functions to the one or more digital signal processors based on said code and data written by the CPU; and the one or more digital signal processors performing digital communications functions in response to the microcontroller selectively assigning functions to the one or more digital signal processors.

18. The method of claim 17, wherein the digital communications device further includes a CPU local memory coupled between the dual port bus arbiter and the CPU, wherein the CPU local memory stores code and data used by the CPU for performing communication control operations, the method further comprising:

the dual port bus arbiter receiving requests from each of the microcontroller and the CPU for access to the CPU local memory; and the dual port bus arbiter selectively granting access to the CPU local memory to one of either the microcontroller or the CPU based on said received requests.

19. The method of claim 17, further comprising:

the microcontroller selectively assigning tasks to each of said one or more digital signal processors to attain a desired computational throughput.

20. The method of claim 17, wherein each of said one or more digital signal processors is configurable to operate at a clock rate, the method further comprising:

the microcontroller selectively controlling the clock rates of each of said one or more digital signal processors to reduce power consumption.

21. The method of claim 17, further comprising:

the CPU accessing code and data from the CPU local memory during said microcontroller accessing the code and data written by the CPU.

22. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

one or more digital signal processors (DSPs) coupled to the system bus for performing communication functions;

a microcontroller coupled to said system bus which controls operations of said one or more digital signal processors, wherein the microcontroller is configured to access code and data from the system memory, wherein the microcontroller is configured to control operations of the one or more digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a dual port bus arbiter coupled between the system bus and the CPU, wherein the dual port bus arbiter controls arbitration and access to the system bus, wherein the dual port bus arbiter is configured to receive requests from each of the microcontroller and the CPU for access to the system bus and selectively grant control of the system bus to one of either the microcontroller or the CPU; and a CPU local memory coupled between the dual port bus arbiter and the CPU, wherein the CPU local memory stores code and data used by the CPU for performing communication control operations; and wherein the dual port bus arbiter is also configured to receive requests from each of the microcontroller and the CPU for access to the CPU local memory, wherein the dual port bus arbiter selectively grants access to the CPU local memory to one of either the microcontroller or the CPU.

23. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

one or more digital signal processors (DSPs) coupled to the system bus for performing communication functions;

a microcontroller coupled to said system bus which controls operations of said one or more digital signal processors, wherein the microcontroller is configured to access code and data from the system memory, wherein the microcontroller is configured to control operations of the one or more digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a bus arbiter coupled to the system bus which controls arbitration and access to the system bus, wherein the bus arbiter is configured to receive requests from each of the microcontroller and the CPU for access to the system bus and selectively grant control of the system bus to one of either the microcontroller or the CPU; and a CPU local memory coupled to the CPU, wherein the CPU local memory stores code and data used by the CPU for performing communication control operations;

wherein the CPU is operable to access code and data from the CPU local memory while the microcontroller accesses code and data from the system memory.

24. A digital wireless communication system for performing communications according to one of a plurality of different digital standards, wherein the system is configurable to operate according to different ones of said plurality of digital standards, the digital wireless communication system comprising, on a single integrated circuit:

a system bus for transmitting data;

system memory coupled to the system bus for storing code and data;

at least two digital signal processors (DSPs) coupled to the system bus for performing communication functions;

one or more address/data buses coupled between the at least two DSPs for communicating data between the at least two DSPs;

a microcontroller coupled to said system bus which controls operations of said at least two digital signal processors, wherein the microcontroller is configured to access code and data from the system memory, wherein the microcontroller is configured to control operations of the at least two digital signal processors;

a voice coder/decoder (codec) coupled to the system bus, wherein the voice codec includes analog to digital conversion logic and digital to analog conversion logic;

a central processing unit (CPU) coupled to the system bus, wherein the CPU implements one of a plurality of possible protocol stacks for digital communication;

a dual port bus arbiter coupled between the system bus and the CPU, wherein the dual port bus arbiter controls arbitration and access to the system bus, wherein the bus arbiter is configured to receive requests from each of the microcontroller and the CPU for access to the system bus and selectively grant control of the system bus to one of either the microcontroller or the CPU; and a CPU local memory coupled between the dual port bus arbiter and the CPU, wherein the CPU local memory stores code and data used by the CPU for performing communication control operations;

wherein the dual port bus arbiter is also configured to receive requests from each of the microcontroller and the CPU for access to the CPU local memory, wherein the dual port bus arbiter selectively grants access to the CPU local memory to one of either the microcontroller or the CPU.

25. A method for performing digital communications functions in a digital communications device comprising a system memory, a dual port bus arbiter coupled to the system memory which controls arbitration and access to the system memory, one or more digital signal processors (DSPs) coupled to the system memory, a microcontroller coupled to the system memory, a CPU coupled to the system memory, and a CPU local memory coupled between the dual port bus arbiter and the CPU, the method comprising:

the dual port bus arbiter receiving requests from each of the microcontroller and the CPU for access to the CPU local memory;

the dual port bus arbiter selectively granting control of the CPU local memory to one of either the microcontroller or the CPU based on said received requests;

the CPU writing code and data to the system memory to configure the microcontroller to perform desired functions;

the microcontroller accessing the code and data written by the CPU;

the microcontroller selectively assigning functions to the one or more digital signal processors based on said code and data written by the CPU; and the one or more digital signal processors performing digital communications functions in response to the microcontroller selectively assigning functions to the one or more digital signal processors.

26. A method for performing digital communications functions in a digital communications device comprising a system memory, one or more digital signal processors (DSPs) coupled to the system memory, a microcontroller coupled to the system memory, and a CPU coupled to the system memory, and a CPU local memory coupled between the microcontroller and the CPU, the method comprising:

the CPU writing code and data to the system memory to configure the microcontroller to perform desired functions;

the microcontroller accessing the code and data written by the CPU;

the CPU accessing code and data from the CPU local memory during said microcontroller accessing the code and data written by the CPU;

the microcontroller selectively assigning functions to the one or more digital signal processors based on said code and data written by the CPU; and the one or more digital signal processors performing digital communications functions in response to the microcontroller selectively assigning functions to the one or more digital signal processors.

* * * * *